(12) United States Patent
Sahinoglu et al.

(10) Patent No.: US 7,995,644 B2
(45) Date of Patent: Aug. 9, 2011

(54) DEVICE, METHOD AND PROTOCOL FOR PRIVATE UWB RANGING

(75) Inventors: Zafer Sahinoglu, Arlington, MA (US); Philip V. Orlik, Cambridge, MA (US); Andreas F. Molisch, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 658 days.

(21) Appl. No.: 12/089,744

(22) PCT Filed: Nov. 10, 2005

(86) PCT No.: PCT/US2005/041118
§ 371 (c)(1),
(2), (4) Date: Apr. 10, 2008

(87) PCT Pub. No.: WO2007/021292
PCT Pub. Date: Feb. 22, 2007

(65) Prior Publication Data
US 2008/0259896 A1    Oct. 23, 2008

Related U.S. Application Data

(60) Provisional application No. 60/706,434, filed on Aug. 9, 2005.

(51) Int. Cl.
*H04L 12/06* (2006.01)
(52) U.S. Cl. ........ 375/221; 375/141; 375/249; 342/109; 342/118
(58) Field of Classification Search ........... 375/141, 375/147, 220, 22, 316, 324, 340, 377; 342/106, 342/109–111, 118, 125, 126, 357.2, 357.21, 342/357.22, 357.23, 357.25, 357.34; 340/991–994; 370/249
See application file for complete search history.

(56) References Cited

U.S. PATENT DOCUMENTS

| | | | |
|---|---|---|---|
| 6,665,333 B2 * | 12/2003 | McCrady et al. | 375/147 |
| 7,529,551 B2 * | 5/2009 | Tanaka et al. | 455/456.6 |
| 7,602,339 B2 * | 10/2009 | Fullerton et al. | 342/463 |
| 2002/0097184 A1 | 7/2002 | Mayersak | |
| 2003/0076239 A1 | 4/2003 | Wenzel | |
| 2003/0139190 A1 | 7/2003 | Steelberg | |
| 2003/0151506 A1 * | 8/2003 | Luccketti | 340/539.13 |
| 2004/0209598 A1 | 10/2004 | Beamish | |
| 2005/0078626 A1 | 4/2005 | Ogino | |
| 2005/0136892 A1 | 6/2005 | Oesterling | |

FOREIGN PATENT DOCUMENTS

JP    2004-258009    9/2004
WO    96/39749    12/1996

* cited by examiner

*Primary Examiner* — Dac V Ha
(74) *Attorney, Agent, or Firm* — Dirk Brinkman; Gene Vinokar

(57) ABSTRACT

An apparatus, system, method and computer program product for secure ranging between at least two devices in radio communications with each other. In particular, an apparatus, system, method and computer program product for secure ranging between at least two devices communicating via ultra wideband (UWB) protocols. Either ternary-IR or time-hope-IR sequences are used for ranging and security. A first device transmits a range packet. A second device responds to the range packet after a delay time known only to the first and second devices. The delay time can be selected randomly by either to the first device or the second device and made known to the other device in an encrypted notification packet.

20 Claims, 12 Drawing Sheets

| | |
|---|---|
| $S_1$ | +0++000-+-++00++0+00-0000-0+0-- |
| $S_2$ | +-0+0+00+000+0++---0-+00-++0000 |
| $S_3$ | 0+-+000+0-0++0-0000+-00-00-++++ |
| $S_4$ | 0+0000-00-0+-00+++-+000-++0+++0- |
| $S_5$ | -++0-+---00+00++0000+0+-0+0+000 |
| $S_6$ | 0+++-++0+000+00-0-0-++0000--+00-+ |
| $S_7$ | 0000++++-+++-0+0+0-0-00++00--++0-+-0-00+0+000+-0+++-0-+-0-0-0--00+00+000+- +0000+0-+++--00+0+0--00--0+0+00+--00-0-0000++00000++00 |
| $S_8$ | +-00-000+-000-0---+0000+000-+-0++0000+++--0-+++000000+0+0++0+++----00- +0+-0+0-0-000-00-00++00+00+++0++0+-0-0-00-0-00-0-00+0-00+ |
| $S_9$ | -00+++0+0++-0+-++-0+0-00+00++00+0+++-0+++-0-+0++0000-0-+-000--+0+0000-0-+-00+0000-0-++00000-00---+++- 000--0+0-0-+++00+-00+-00+000+000-0000--+-00--+-0-+0+0+00--+0- |
| $S_{10}$ | 000-0-0-++-+0+0+00+000000-000-00--000-0+-0-0-0-0+-00000+-000+++0000+++000--++0000+++-0--++00+0- +00+00+00+000000-000-00--000-0+-0-0-0-0+00000+-00+-0+00--++00+++-+0+-0-0+0 |
| $S_{11}$ | 0+-0++0+000+---+-0000+---+-000+0+++-000+0++0+++0+++0+000000++0-0--+-0+0+0+00++0+--- 00+0000+000+00-00-++-0-0-00000-0-+-+0+0-+0+-00+0-+000-+0 |

DEVICE, METHOD AND PROTOCOL FOR PRIVATE UWB RANGING

CROSS-REFERENCE TO RELATED APPLICATIONS

The present application is claims priority to U.S. provisional application 60/706,434, filed on Aug. 9, 2005, the entire contents of which is incorporated herein by reference.

BACKGROUND OF THE INVENTION

1. Field of the Invention

An apparatus, system, method and computer program product for private ranging between at least two devices in radio communications with each other. In particular, an apparatus, system, method and computer program product for private ranging between at least two devices communicating via ultra wideband (UWB) protocols.

2. Background of the Invention

There is a growing demand for location awareness in short range radio networks, particularly UWT networks. Location awareness implies that the location of the devices is known. Typically, the location of the devices becomes known using radio ranging.

UWB or, digital pulse wireless is a wireless technology for transmitting large amounts of digital data over a wide spectrum of frequency bands with very low power for a short distance. Ultra wideband radio signals not only can carry a huge amount of data over a distance up to 230 feet at very low power (less than 0.5 milliwatts), but have the ability to carry signals through doors and other obstacles that tend to reflect signals having more limited bandwidths and a higher power.

Ultra wideband signals are broadcast concurrently as digital pulses that are timed very precisely on a carrier signal across a very wide spectrum of frequencies. A transmitter and a receiver are synchronized to send and receive pulses with an accuracy of trillionths of a second. On any particular frequency, the ultra wideband signal has less power than normal and anticipated background noise. Theoretically, interference with conventional radio signals is negligible.

Ultra wideband communication has two main types of application:

Applications involving radar, in which the signal penetrates nearby surfaces but is reflected by surfaces that are farther away, allowing objects to be detected behind walls or other coverings.

Voice and data transmission application, in which digital pulses allow a very low powered and relatively low cost signal to carry information at very high data rates over a short range.

In the U.S., the Federal Communications Commission approved the commercial use of ultra wideband signals on Feb. 14, 2002.

UWB applications communicate in accordance with a protocol stack as shown in FIG. 1. Here a device 101 is in communication with a device 102 via wireless link 100. The protocol for the communications in each device includes a physical layer (PHY) 110, a media access control (MAC) layer 120, a network layer 130, a transport layer 140, a session layer 150, a presentation layer 160, and an application layer 170.

As shown in FIG. 2, conventional UWB two-way ranging may be performed by two devices. Conventionally, a range packet (230) is first sent from a device A (210) to a device B (220). Upon receipt at the device B (220), a range packet (240) is returned to device A (210).

FIG. 3 provides more details about the two-way ranging described relative to FIG. 2. Again, the two devices 210 and 220 are in communication with each other. The first device 210 includes an originator media access controller 410 which sends a range request 450 to an originator physical controller 420. This range request causes the originator physical controller 420 to send a range packet 230 to the receiving device 220. Within the receiving device 220, a receiving device physical layer controller 430 receives the range packet 230, the range packet 230 is processed during a turn around time 455, and a response range packet 240 is sent to the first device 210. This response range packet 420 is received by the originator physical layer controller 240. The originator physical controller 420 sends a range confirmation signal 460 to the originator media access controller 410.

As a specific example, consider a time-of-arrival (TOA) based ranging system. First at the MAC layer of the originator, A, the range request is generated and passed to the PHY layer. Then, the PHY transmits the range packet to the device 220. The device 220 receives the range packet and sends the response packet 240 to device A. Assume that the elapsed time between the departure time of A's message and the arrival time of the reply from device 220 at device 210 is $T_r$. The time $T_r$ can be approximated as $T_r = 2T_f + T_{t_a}$, where $T_f$ is the one way time of flight of the signal and $T_{t_a}$ is the turn around time 455, the time difference between the reception timestamp of signal at device 220 and the departure timestamp of reply from device 220. Typically, each wireless packet (or message) includes a preamble, a MAC header and a payload. When a packet is received, the processing of the preamble is done first for acquisition, synchronization and ranging. Then, the rest of the packet is passed to the MAC layer. In order to decrease a positive bias in the ranging error due to $T_{t_a}$, device 220 can process the preamble of a received message at its physical (PHY) layer, and reply to the range packet before passing the header and the payload to the MAC layer. This minimizes the turn around time 455. However, such a step imposes a vulnerability for device 220, because the response reveals the range to device 210 without knowing whether device 210 is an authentic device. On the other hand, if device 220 withholds its reply until its MAC layer authenticates device 210, the turn around time becomes undesirably long. Thus, what is desired, as discovered by the present inventors, is an apparatus, system, method and computer program product for private ranging between at least two devices communicating via ultra wideband (UWB) protocols.

To meet the need for improved and private location awareness in UWB, an IEEE 802.15.4a Task Group (TG) has been established to develop a UWB-based physical (PHY) layer standard with a precision ranging capability. An UWB signal has a relative bandwidth larger than 20% or absolute bandwidth of at least 500 MHz. One type of an UWB system is an impulse radio (IR). IR uses extremely short duration pulses to generate signal waveforms, and allows fine time resolution of channel multipath characteristics, which is important in identifying the line of sight signal for precision ranging. If a ranging process does not involve MAC layers, then the process is called fast ranging.

In UWB ranging, the goal is to accurately estimate the distance between two devices. In a paper by J-Y. Lee and R. A. Scholtz, "Ranging in a dense multipath environment using an UWB radio link," IEEE Trans. Select Areas in Communications, vol. 20, issue 9, pp. 1677-1683, December 2002, the entire contents of which is incorporated by reference, a time-of-arrival (TOA)-based ranging scheme using an ultra-wideband (UWB) radio link is described. That ranging scheme implements a search process for the detection of a direct path signal in the presence of dense multipath, utilizing generalized maximum-likelihood (GML) estimation. Models for critical parameters in the process are based on statistical analysis of propagation data. The process is tested on another independent set of propagation measurements. That UWB ranging system uses a correlator and a parallel sampler with a high-speed measurement capability in the transceiver to accomplish two-way ranging in the absence of synchronized clocks.

In a paper by S. Gezici, Z. Tian, G. B. Giannakis, H. Kobayashi, A. M. Molisch, H. V Poor, Z. Sahinoglu, "Localization Via UWB Radios," IEEE Signal Pro. Magazine, v.22, n. 4, pp. 70-84, July 2005, the entire contents of which is incorporated by reference, localization techniques relying on wireless ultra-wideband (UWB) signaling are described. Various localization alternatives are considered and the UWB time-of-arrival based one is found to have a highest ranging accuracy.

The challenges in UWB positioning problems, such as multiple-access interference, multipath and non-line-of-sight propagation are presented along with the fundamental limits for time-of-arrival estimation and time-of-arrival-based positioning. To reduce the complexity of optimal schemes achieving those limits, suboptimal alternatives have been developed and analyzed. Moreover, a hybrid scheme that incorporates time-of-arrival and signal strength measurements is known investigated.

In the prior art, mainly signal waveform design and development of signal edge detection techniques have been described. Also various range measurement techniques are available. The two well-studied are Time of Arrival (TOA) and Time Difference of Arrival (TDOA). The TOA requires an exchange of a pair of messages between two devices to eliminate clock offsets, while the TDOA relies on arrival-time differences of messages from two sources. The accuracy of a range estimate depends on the speed at which the message exchanges occur. It is typical for a ranging system to have a very fast response to a message at the receiving device due to a small fast around time. However, this ability to have a fast turn around time poses many design problems, where one of these design problems concerns security.

Patent Publication No. 2005/0166040 describes a method for enabling secure communications between multiple devices. That document describes a method for generating and sending a message from a first device. The method includes the steps of: determining a message including an action; generating an authentication code on the basis of the action and a parameter, the parameter being indicative of an attribute of the action; and sending the message and authentication code from the first entity. The method maps various actions to various parameters, and then an authentication code is assigned to the parameters. However, for private ranging, authentication alone is insufficient, because message exchanges happen between the physical layers of involved devices.

Patent Publication No. 2005/0073433 describes precision measuring collision avoidance system and refers to two-way message exchanges for distance estimation. However, that document does not address security or any means to decrease the turn around time.

Patent Publication No. 2005/0078626 describes a method and system for detecting the position of a mobile unit in a multi-path environment. The document describes an order of message flows between mobile stations, a server and a base station, and wireless communication means. The base station sends a wireless signal to the wireless communication means requesting the transmission of a specific wireless signal. The wireless communication means sends a wireless signal in response to this request to the base station. The method obtains different signals with multi-path characteristics on receivers by a wireless receiver capable of sending and receiving to and from different antenna positions used by the mobile stations and by measuring the timing of wireless signals exchanged among the base station and the wireless receivers. However, that document does not address security aspects in ranging.

Patent Publication No. 2003/0076239 describes a method for locating moving objects. At least one interrogator arranged in a stationary position relative to a path of movement of an object, and the interrogator transmits an electromagnetic signal within a reading range. The moving object carries at least one transponder, which transmits a response signal to the transmitted signal. The interrogator receives and evaluates the response signal. The transponder's response signal contains information identifying the transponder. However, that document does not address security aspects in ranging.

Patent Publication No. 2002/0097184 describes a method in which the location of a radio frequency emitting target device, in absolute or relative GPS coordinates, from a single airborne platform is determined. The method is shown to prevent single and multiple GPS jammers from being able to jam conventional GPS signals. The method uses a signal processing technique, which emulates an antenna moving at very high velocities to induce a virtual Doppler shift on signals incident upon a linear antenna array, and relates the virtual Doppler shift to the signal direction of arrival. That method prevents jamming during GPS based positioning. However, that document does not describe private ranging.

Patent Publication No. 2005/0136892 describes a system and method providing secure authentication of a wireless communication channel for a vehicle telematics device that includes detecting a wireless access point within radio range of a telematics device, requesting authentication information for the access point through a first secure communication channel to a call center, receiving authentication information for the wireless access point from the call center through the first secure communication channel, and providing authentication information for the telematics device to the wireless access point through a second secure communication channel. However, that approach requires the use of specially established secure channels, thus incurring an operational overhead complexity and expense.

Patent Publication No. 2004/0209598 describes a method and apparatus for establishing secure wireless links between a handset and a base station in a wireless telephone systems. The method for generating a secure wireless link between a handset and a base station includes initiating a linking procedure, generating a security code, displaying the security code at the base station, entering the security code into the handset and then establishing a radio frequency link between the handset and the base station utilizing the security code. However, that method requires direct user involvement and does not provide for private ranging.

Patent Publication No. 2003/0139190 describes a method and apparatus for providing authenticated, secure, communication between a gaming host communicating via radio frequency (RF) sub-carriers to a remote user device in another location. Location of the remote user device and the host server are determined by accessing signals generated by either Global Positioning System (GPS) satellites, or by terrestrial radio broadcast stations, through a process known as radio frequency trilateration. Player authentication (identity verification) is determined by use of a personal identification number. In GPS based positioning, a GPS receiver receives signals from multiple satellites. Each satellite transmits a unique signal assigned to it so-called signature. The signature consists of pseudo-random noise (PRN) code. That unique identifier is repeated and serves the purposes of identification and signal transit time measurement. Any receiver receives the same signal from the same satellite. GPS does not vary the waveform from a ranging operation to another. In GPS, messages are not exchanged, and signal transmission is one-way from the satellites to the receivers. Thus, GPS does not support two-way ranging.

SUMMARY OF THE INVENTION

An apparatus, system, method and computer program product for secure ranging between at least two devices in radio communications with each other. In particular, an apparatus, system, method and computer program product for secure ranging between at least two devices communicating via ultra wideband (UWB) protocols. Either ternary-IR or time-hope-IR sequences are used for ranging and security.

A first device transmits a range packet. A second device responds to the range packet after a delay time known only to the first and second devices. The delay time can be selected randomly by either to the first device or the second device and made known to the other device in an encrypted notification packet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein like reference numerals designate identical or corresponding parts throughout the several views, and:

FIG. 9 is a list of ternary sequences according to one embodiment of the present invention;

DETAILED DESCRIPTION OF THE PREFERRED EMBODIMENTS

As described above, conventional authentication techniques are insufficient for private ranging in wireless communications networks, because the ranging is performed on an unencrypted preamble of a packet. Therefore, conventional techniques for authenticating an originator at a MAC layer, and then doing fast ranging at PHY layers does not guarantee privacy.

As discovered by the present inventors, one effective way to achieve private ranging is that an originator device and a target device determine a ranging preamble waveform and structure. In order to ac this, the originator device randomly manipulates a preamble of a range packet. How the preamble is manipulated by the originator device can be transmitted to the target device within a payload of a range notification packet. The target device can optionally acknowledge the range notification packet. After the preamble of the range packet is known to both devices, the devices can form and exchange range packets at the PHY layer, as shown in FIGS. 4 and 5.

Figure 1:
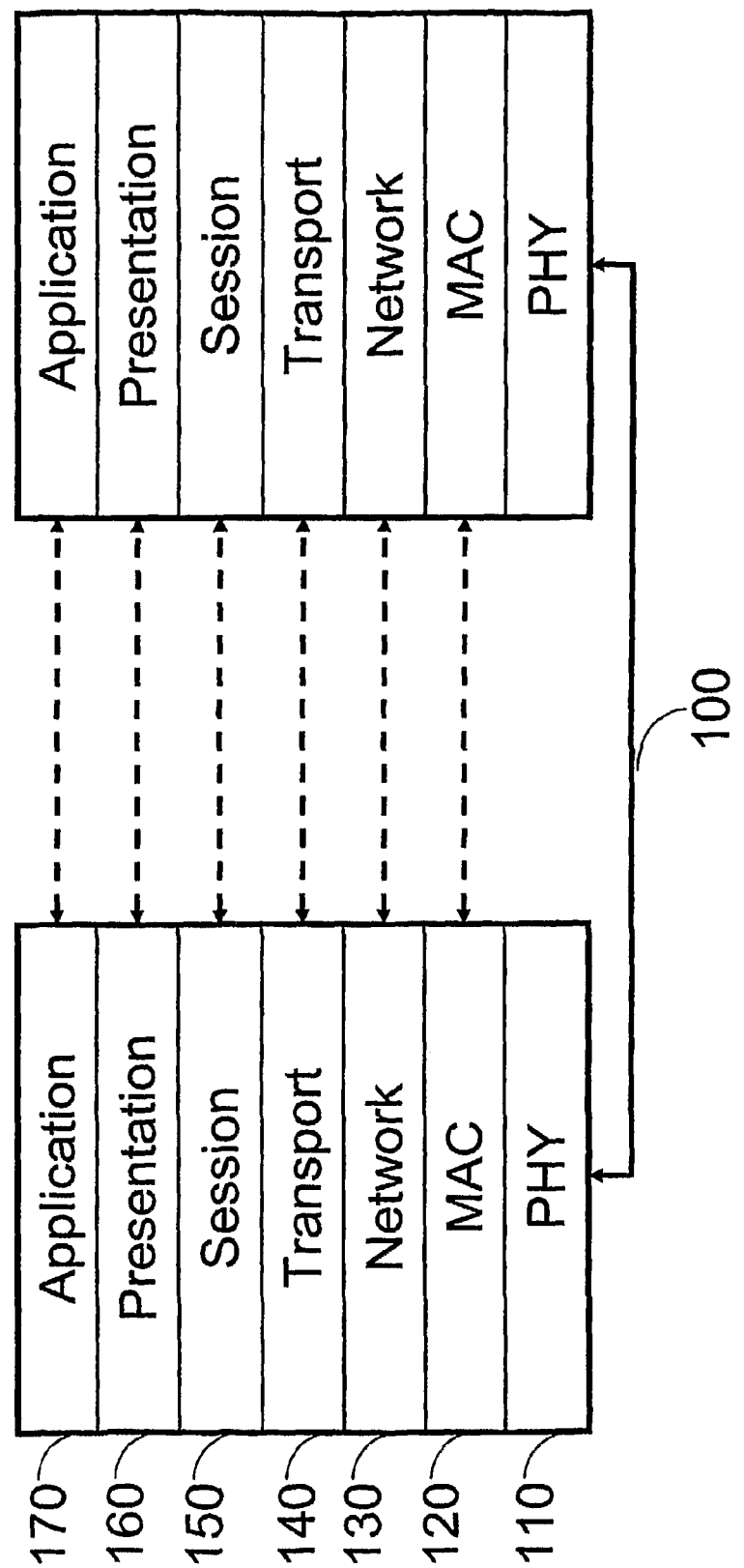
FIG. 1 is a block diagram of a protocol used in ultra wideband communication.
Figure 2:
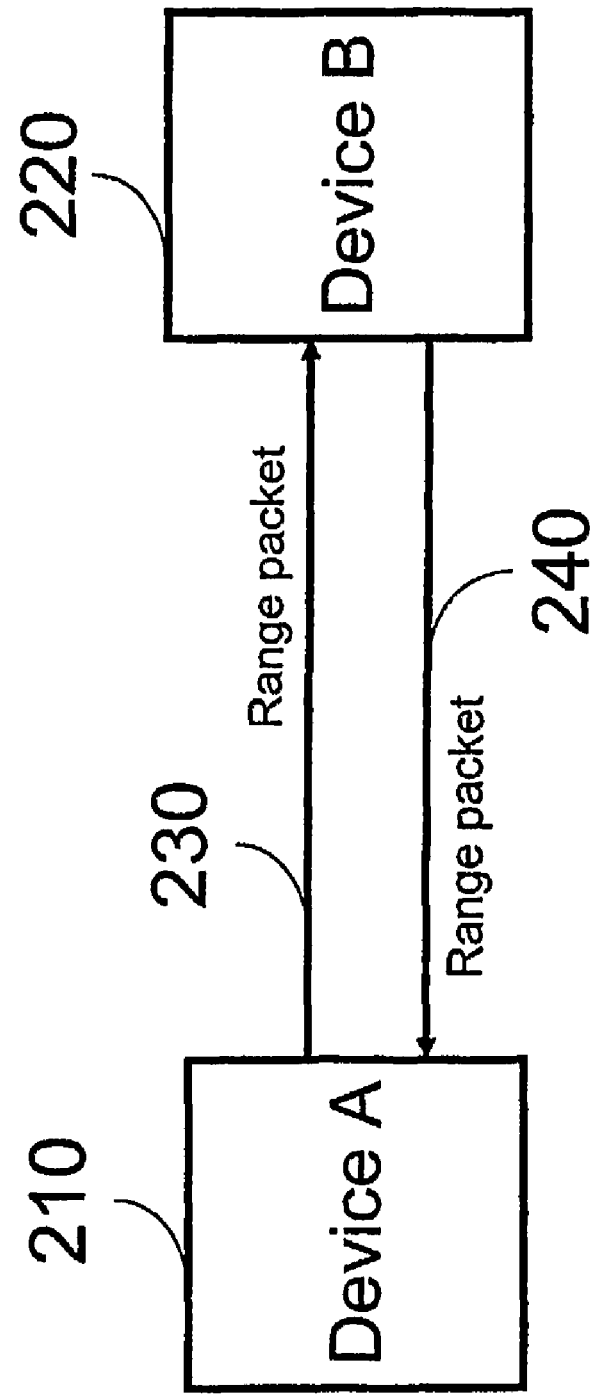
FIG. 2 is a block diagram of conventional ultra wideband ranging.
Figure 3:
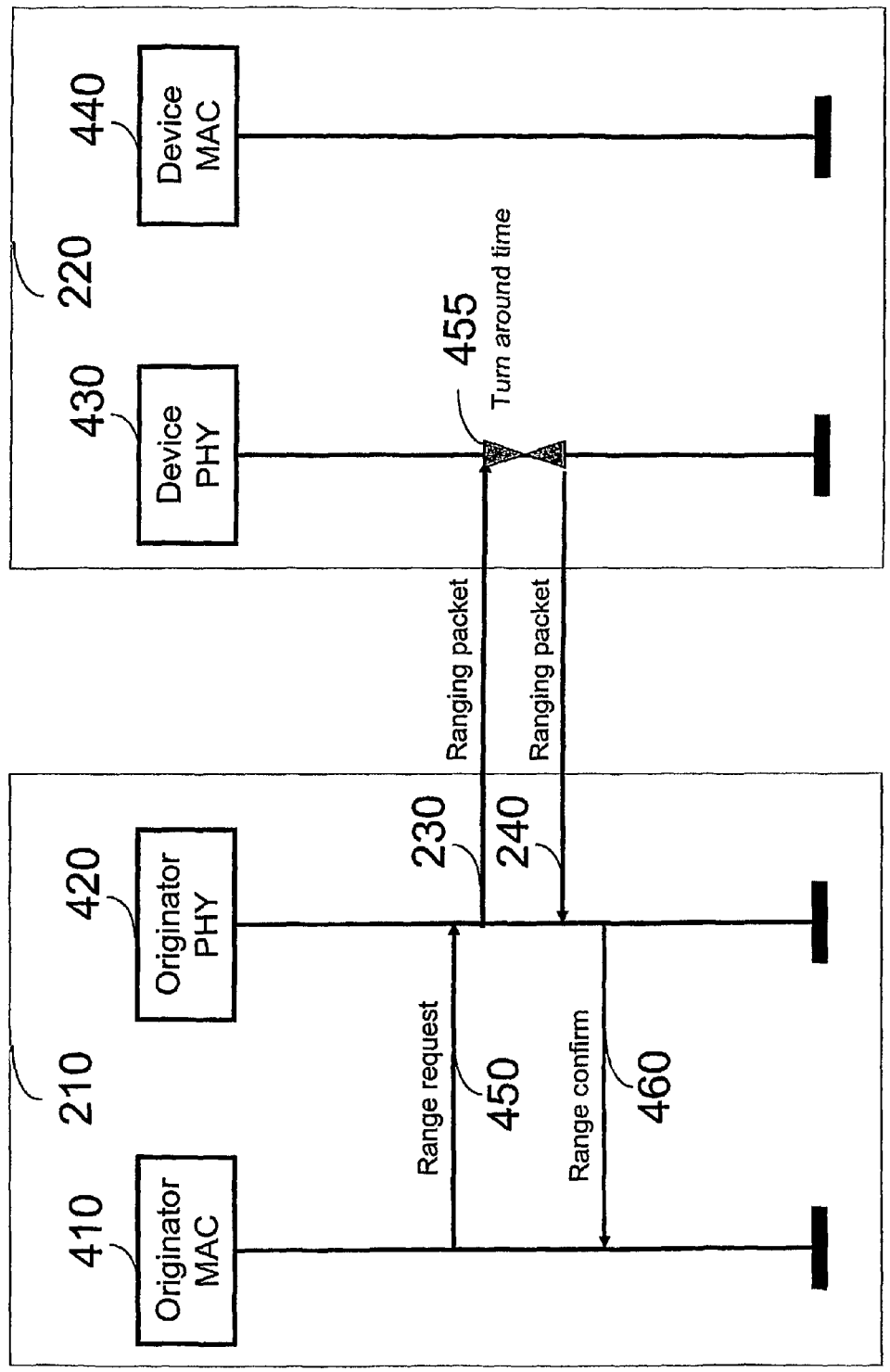
FIG. 3 is a more detailed block diagram of conventional ultra wideband ranging.
Figure 4:
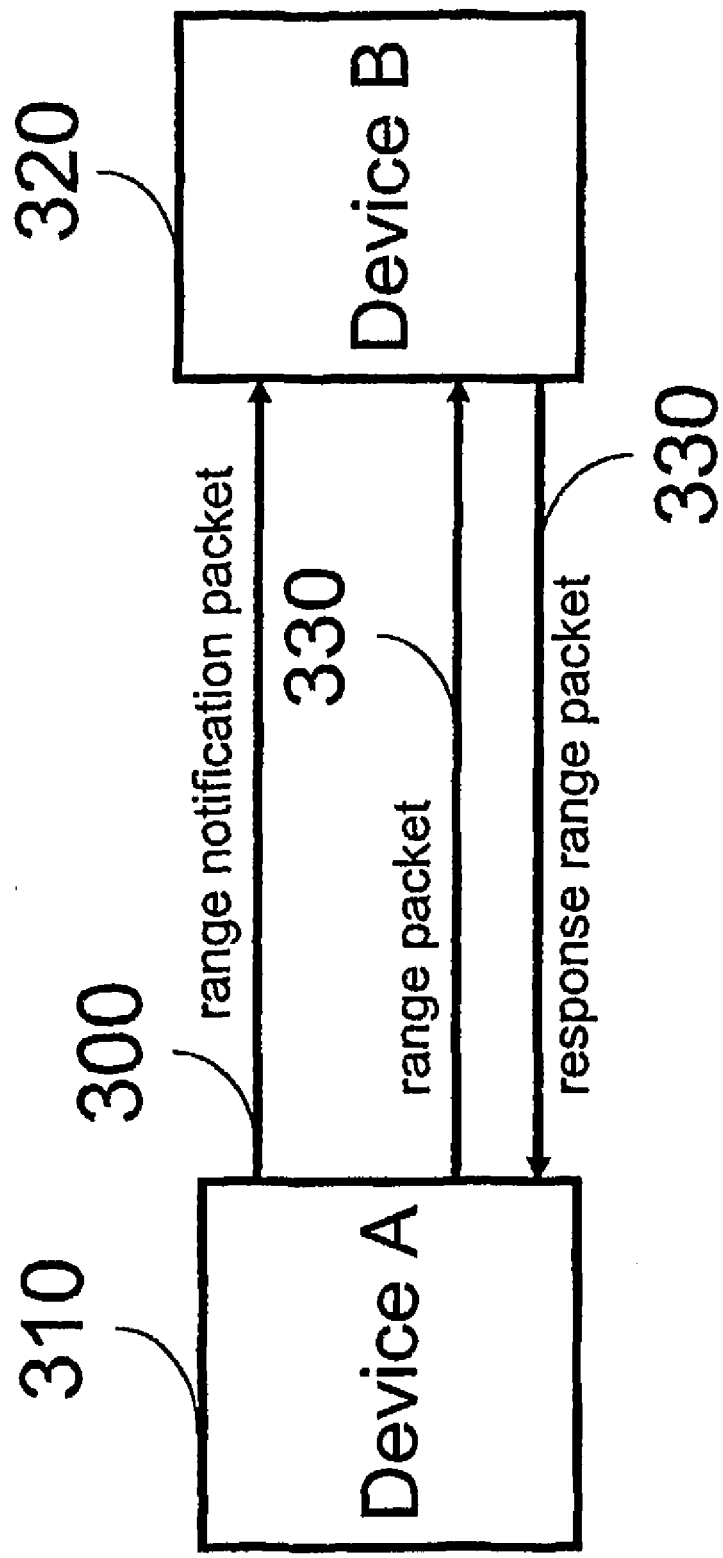
FIG. 4 is a block diagram of ranging in accordance with one embodiment of the present invention.

In FIG. 4, device A (310) is in communication with device B (320). Device A can send the range notification packet 300 to device B. Subsequently, device A sends a range packet 330 to device B. In response to receiving the range packet 330, device B transmits the range packet 330 back to device A after a delay time known only to the two devices. Because of clock drift over time, it is desired to perform the ranging over as short as possible time intervals. Due to unavoidable latencies in of the physical layer, the delay time is nominally in the order of 10 nanoseconds when the range packet is handled at the physical layer. The actual delay time is 'dithered' randomly by about ±1 nanoseconds, as described below. Thus, it becomes difficult for third parties to calculate the range between the device, because the third parties are unaware of the real delay time. Privacy of the ranging is further enhanced by encrypting the various ranging packets.

Figure 5:
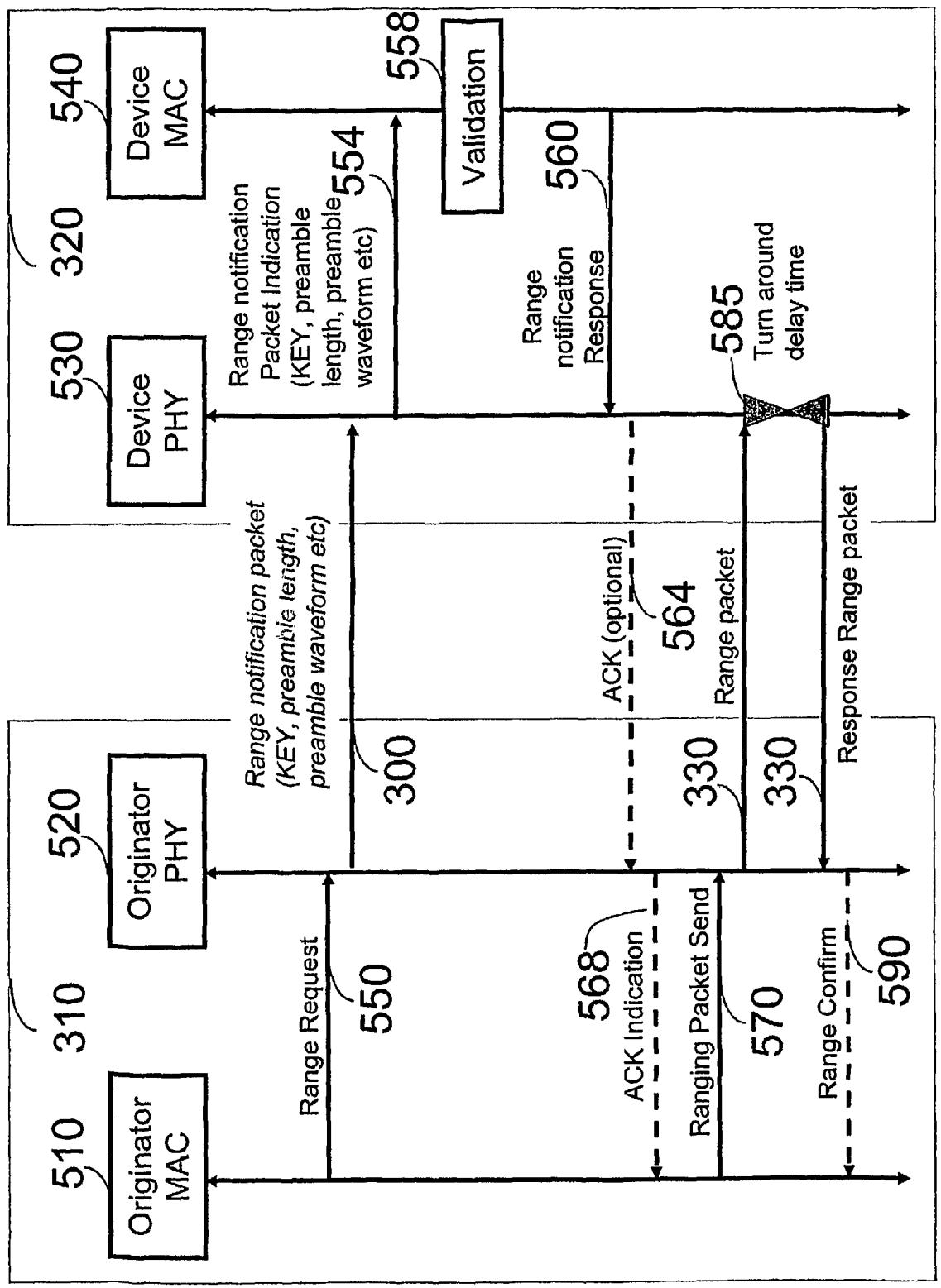
FIG. 5 is a more detailed block diagram of ranging according to one embodiment of the present invention.

As shown in detail in FIG. 5, an originator media access controller 510 of the originator device 510 generates a range request 550 for an originator physical layer controller 520. In response to the range request, the originator physical layer controller 520 transmits a range notification packet 300, including a packet identification, a key, a preamble length, a preamble waveform identification index, and a turn-around delay time 585. The range notification packet is received and processed by a physical layer controller 530 of the target device 320. The receiving device physical layer controller 530 sends at least a portion 554 of the received range notification packet to a media access controller 540 of the receiving device 320. The receiving device media access controller 540 validates data in the received range notification packet. A validation 558 of the range notification packet results in the receiving device media access controller 540 generating a range notification response 560 for the receiving device physical layer controller 530. Upon receiving the range notification response 560, the receiving device physical layer controller 530 transmits an acknowledgement ACK 564 for the originator device 310, which is processed by the originator device physical layer controller 520. If the optional ACK 564 is received, then the originator device physical layer controller 520 sends an ACK indication 568 to the originator media access controller 510.

Either upon receiving the ACK indication 568 or after a predetermined time from when the range request 550 was generated, the originating device media access controller 510 generates a range packet 570 which is received and processed by the originating physical layer controller 520. Upon receipt of the range packet, the originator physical layer controller 520 transmits the range packet 330 to the receiving device physical layer controller 530 of the target device. The receiving device physical controller 530 responds to the range packet 330 after the turn around delay time 585, and transmits the response range packet 330 to the originator device, which is received and processed by the originating device physical controller 520.

The turn around delay time 585 can be predetermined by the originator device and included in the range notification packet 300. Alternatively, the target device 320 determines the turn-around delay time 585, and transmits the delay time to the originator device before or after transmitting the response range packet 330 back to the originator device 310.

The originating device physical controller 520 can also generate a range confirmation signal 590 for the originating device access controller 510.

I. Packet Design

In the present invention, two packet types are used to support private ranging: a range notification packet, and a range packet.

A. Range Notification Packet

This packet includes the form of a ranging preamble the target device should expect from the originator device and informs the target device about the format of the response range packet the target device should use. The ranging preamble can be manipulated by varying its length L, using a different base sequence $S_i$ from a sequence pool S, such that $S_i \in S$, and applying a random circular shift k to the selected base sequence to generate $S_i^k$. In addition, the nominal pulse repetition interval (PRI) $T_c$ can be changed via other manipulations that are known only to the originator and target devices, such as time hopping or a drifting local clock. The settings of these variables is included in the payload of the range notification packet (see FIG. 6).

In one option, instead of transmitting the sequence $S_i$ itself from or to the originating device, an index corresponding to the sequence $S_i$ can be transmitted. The target device is expected to form the responded range packet 330 in compliance with the same settings. Therefore, the settings provided in the range notification packet can be saved by the target device. The merits of such manipulations are discussed together with Ternary-IR and TH-IR waveforms in the next section.

To further enhance privacy, the range notification packet can also be used to modify the operation of the target device by specifying the turn around delay time. In this case, the originator device can specify the turn around delay time to be used by the target device. Alternatively, the turn-around delay time is determined by the target, and reported to the originator after before or after the range packet exchanges is performed.

Figure 6:
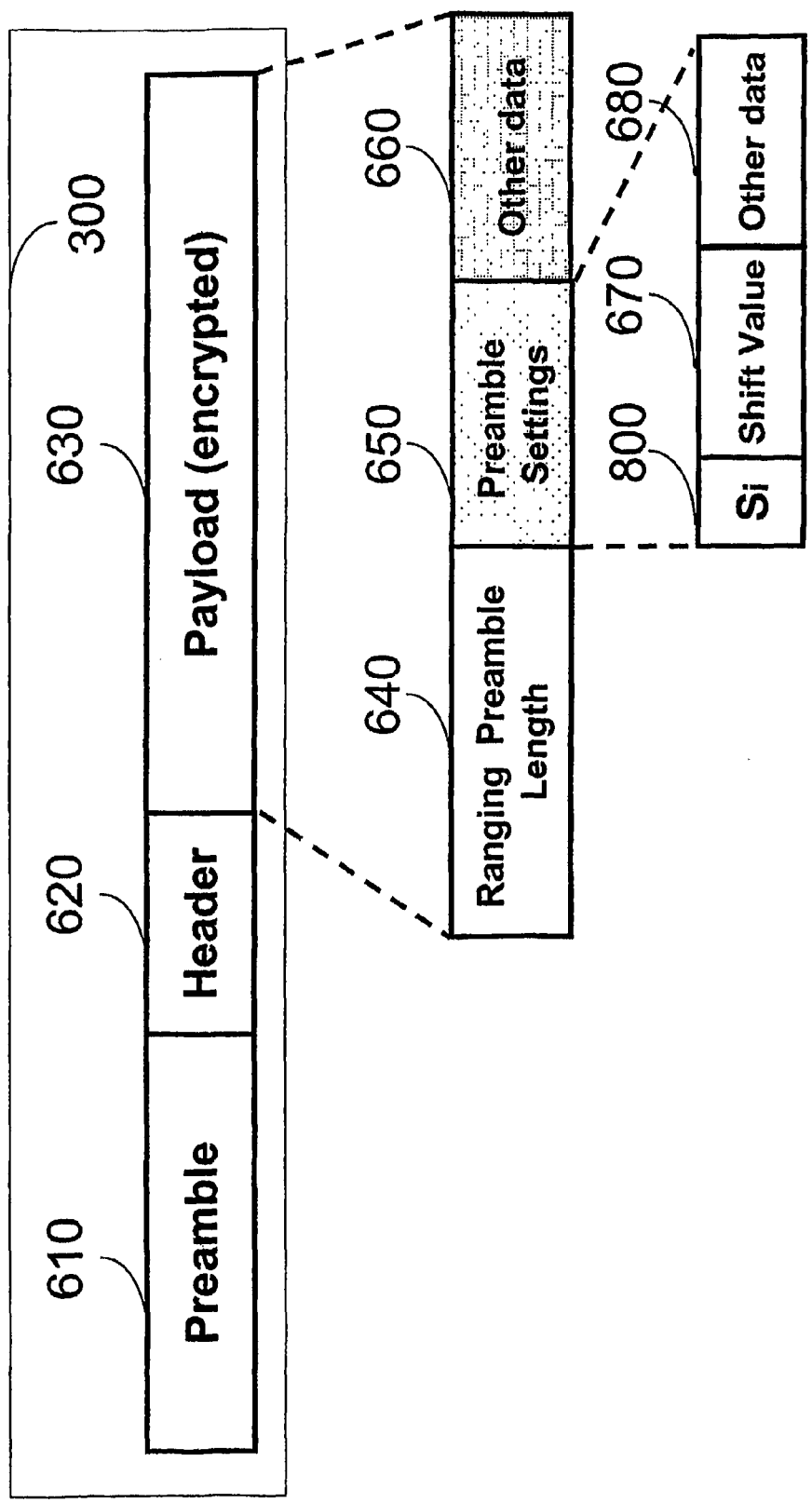
FIG. 6 is a block diagram of a range notification packet according to one embodiment of the present invention.

FIG. 6 shows a structure of the range notification packet 300 according to an embodiment of the present invention. The packet 300 includes a preamble 610, a header 620, and a payload 630. The preamble 610 and header 620 can be used to identify the range notification packet and to provide data about various characteristics about the range notification packet. The payload 630 can be encrypted or otherwise protected from access by other devices. The payload 630 includes a ranging preamble length 640, ranging preamble settings 650, and other data 660. The other data 660 can be used to communicate non-sequence-related parameters, e.g., pulse repetition interval (PRI) $T_c$, turn-around delay time, to be used by the target device when responding to a subsequent range packet. The preamble setting 650 includes a base sequence $S_i$ 800, a shift value 670 and other data 680 to be used by the target when replying. The other data 680 used to indicate sequence-related parameters, e.g., if the actual sequence is to be used or an index, length of sequence, repetition pattern and length, polarity pattern, etc., to be used by the target device when responding to a subsequent range packet. In other embodiments, only one or either of the 'other' data fields 600 and 680 include parameters to be used by the target device when responding to range packets.

B. Range packet

Figure 7:
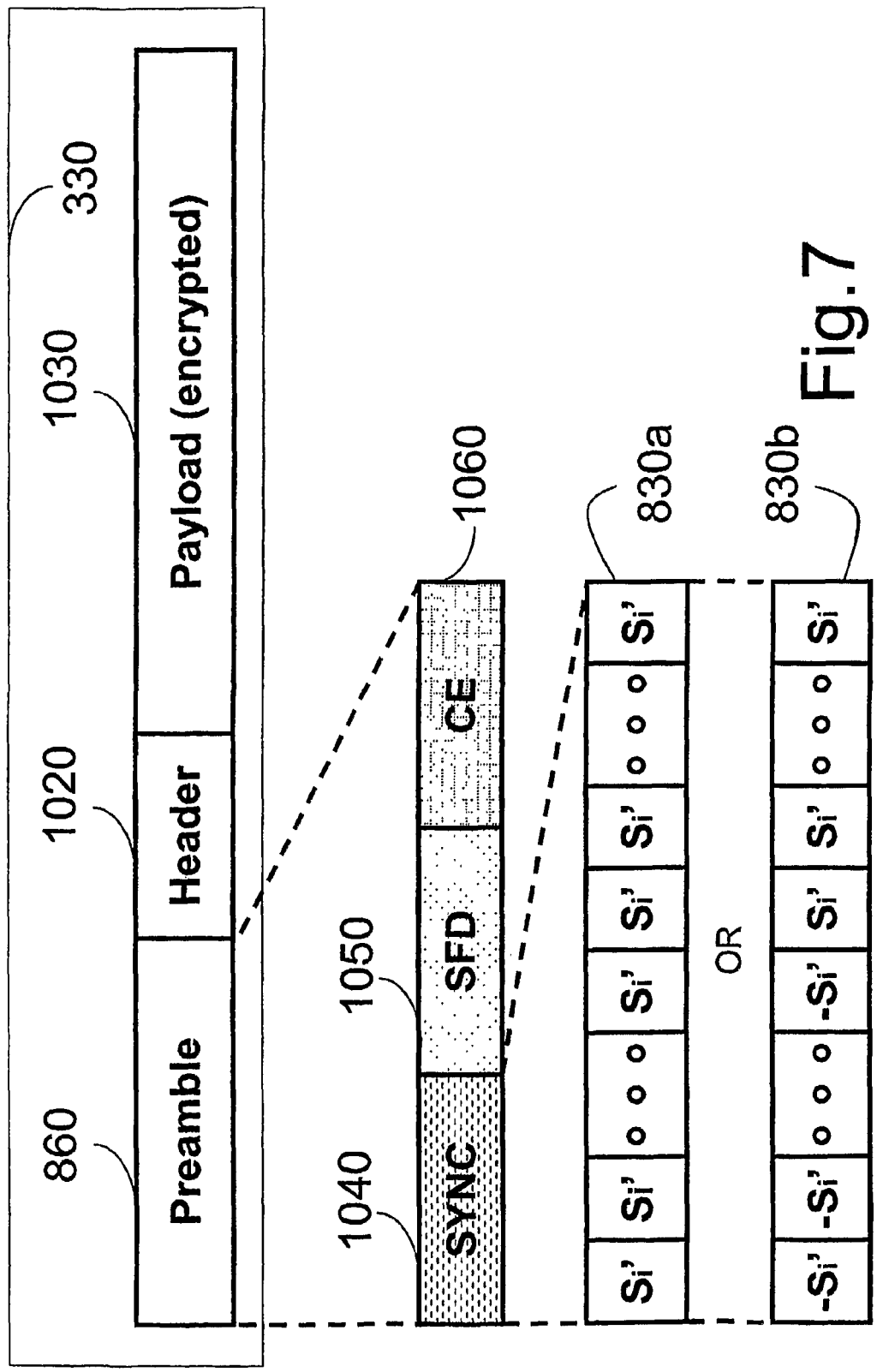
FIG. 7 is a block diagram of a range packet according to one embodiment of the present invention.

The structure of the range packet 330 is shown in FIG. 7. The range packet includes a preamble 860 and, optionally, a header 1020 and payload 1030. The payload 1030 may be encrypted. The preamble 860 includes fields for synchronization (SYNC) 1040, a start frame delimiter (SFD) 1050, and a channel estimation (CE) 1060. The SYNC field 1040 includes circularly shifted ternary sequence 830 repetitions of a signal waveform $S_i^k$, which is called "symbol." In FIG. 7, two possible circularly shifted ternary sequence 830 are shown. The first circularly shifted ternary sequence 830a has all positive polarities. The second circularly shifted ternary sequence 830b has a first half with negative polarities, and a second half with positive polarities. Other polarity schemes are possible.

The number of $S_i^k$ symbols within the SYNC field determines achievable processing gain according to the preamble length and the symbol duration. V. Brethour, "Proposed-classes-ranging-service," IEEE 802.15.4a TG, 15-05-0221-02-004a, May 2005, specifies three preamble lengths: 4 ms, 1 ms and 500 µs. The number of suggested symbol repetitions in the preamble can be determined by dividing the preamble length by the symbol duration. Averaging over multiple symbols increases the signal to noise ratio (SNR) and hence identification of the first arriving multipath is easier. As a result, the accuracy of range estimation is improved.

Figure 8:
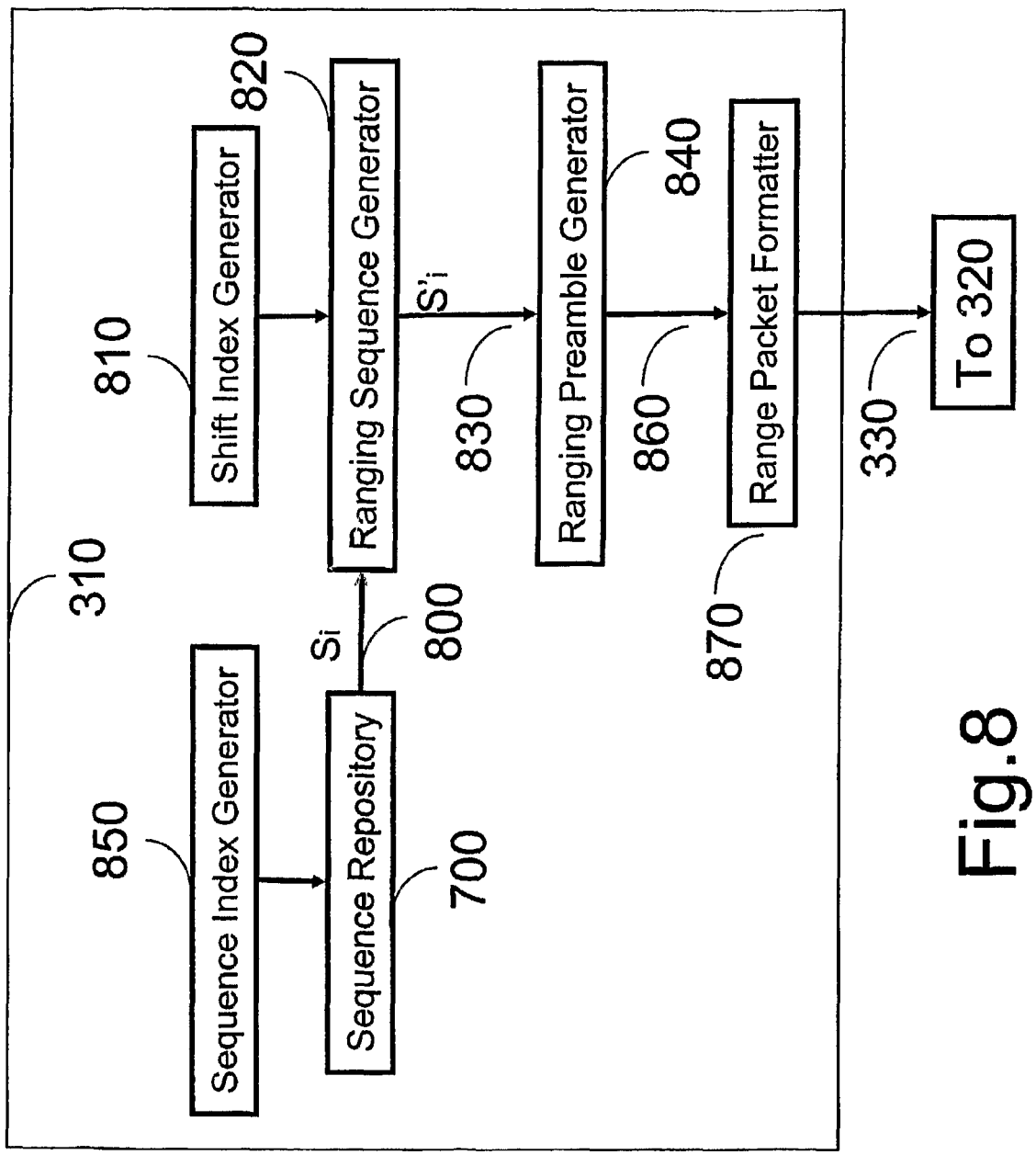
FIG. 8 is a flow diagram of a method for generating a range packet according to an embodiment of the invention.

FIG. 8 is a flow diagram for generating the range packet according to one embodiment of the present invention. A sequence index generator 850 generates a sequence $S_i$ 800, which is stored in a sequence repository 700. If the sequence $S_i$ is a cyclically shifted sequence, then a shift index generator 810 generates shift indices. The shift indices and the sequences $S_i$ are used by a ranging sequence generator 820 to generate a ranging sequence $S'_i$ 830. The shift index can be pre-identified in either the 'other' data fields 600 and 680, or may be randomly generated.

If the sequence $S_i$ is a time hop sequence, then a hopping generator (not shown) generates the hopping sequence.

A ranging preamble generator 840 generates the preamble 860 that includes the ranging sequence 830. The ranging preamble is appended to data by a range packet formatter 870. The range packet 330 is then transmitted to the target 320. Details of a ternary-IR and a TH-IR sequence $S_i$ are described below.

II. Waveform Structure

The structure of a transmitted waveform is important for the performance of any ranging scheme. In the present invention, two different signaling waveforms that support private ranging are described.

The structure of the waveform should consider the following constraints.

The maximum excess delay of an UWB channel can be on the order of 60 ns or larger, A. F. Molisch, "Status of Channel Modeling Final Report," IEEE P802.15-04-0346-00-004a/r0, July 2004. The signaling waveform should have a wide enough zero correlation zone prior to the leading edge to minimize ranging errors caused by side lobes.

Peak to average power ratio (PAPR) and spectral mask requirements by the FCC should be obeyed, see: FCC First Report and Order, FCC-02-48, April 2002, the entire contents of which is incorporated by reference. Namely, the pulse-to-pulse interval can not be larger than a certain value, and the spectral peaks should be suppressed via appropriate methods.

It is beneficial that the received waveforms enable both coherent and non-coherent ranging. In other words, both coherent and non-coherent receivers should be able to process the same waveform for interoperability within the same network Both ternary impulse radio (ternary-IR) and time-hop impulse radio (TH-IR) signal waveforms can satisfy these three constraints. The notations to analytically express transmit preamble waveforms are as follows; $N_{sym}$ is the number of symbols in the preamble of the range packet, ω is the transmitted pulse shape of unit energy, $T_{sym}$ is the symbol duration, T, is the nominal PRI—also referred to as the frame duration in TH-IR, and $N_p$ is the total number of pulses per symbol.

A. Ternary-IR

With Ternary-IR sequences, the transmit preamble waveform $r_{i,k}^{(ter)}$ (t) can be expressed as $$S_i^k(t) = \sqrt{\frac{1}{N_P}} \sum_{j=1}^{N_P} d_{i,j}^{(k)} \omega(t-(j-1)T_c) \quad (1)$$

$$r_{i,k}^{(ter)}(t) = \sum_{i=1}^{N_{sym}} S_i^k(t-iT_{sym}), \quad (2)$$

where $d_{i,j}^{(k)} \in \{-1, 0, 1\}$ is the k-shifted ternary coefficient for the $j^{th}$ pulse in the sequence $S_i$. Ternary sequences that have optimal autocorrelation characteristics are described by I. Lakkis in "15-05-0456-01-004a-pulse-compression," IEEE 802.15.4a Technical Contribution, July 2005, San Francisco, the entire contents of which is incorporated by reference. Unfortunately, as shown in FIG. 9, there are only six length-31 (codes $S_1$-$S_6$) and five length-127 (codes $S_7$-$S_{11}$) sequences that have these properties.

Shifting a ternary sequence by k causes the peak of its periodic correlation to also shift by k chip duration. Assume that pulse repetition interval $T_c$=30 ns and k=1. Then, the peak of the correlation of the original sequence with its periodically repeated shifted version is off by 30 ns. Thus, it is possible to use the k-shift feature of ternary sequences as a security tool. Devices that are unaware of the shift in the received sequences would make a range error of $ckT_c$ in meters, where c=3·10$^6$ M/s.

Figure 10:
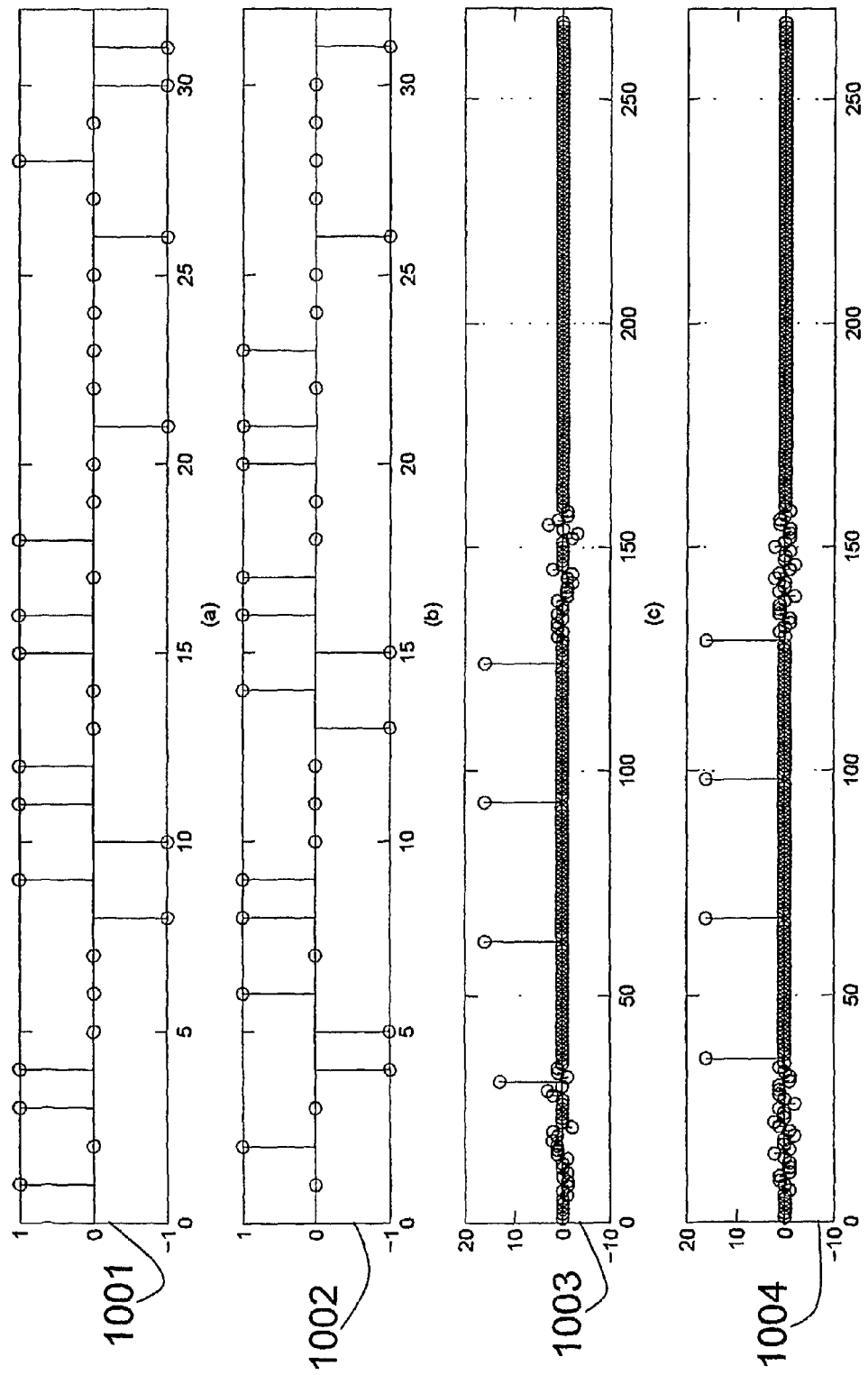
FIG. 10 is a timing diagram of a shift of the correlation peak with a shift in ternary sequences according to one embodiment of the present invention.

The effect of shifting ternary sequences is shown in FIG. 10. In signals 1001 and 1002, the X-axis is a sample index and the y-axis is a correlation output value. Here, a zero shifted sequence $S_1$ (i.e., $S_1^0$) is shown in 1001. Sequence $S_1$ shifted to the right by five, (i.e., $S_1^5$, is shown in signal 1002. The cross-correlation of $S_1^0$ with a periodically repeated version of the basic ternary sequence is shown in signal 1003. The cross-correlation of $S_1^5$ with a periodically repeated version of the basic ternary sequence is shown in 1004. The correlation peaks in 1003 and 1004 are shifted from each other by 30 ns. In signals 1003 and 1004, the X-axis is a sample index and the y-axis is a correlation output value.

Figure 11:
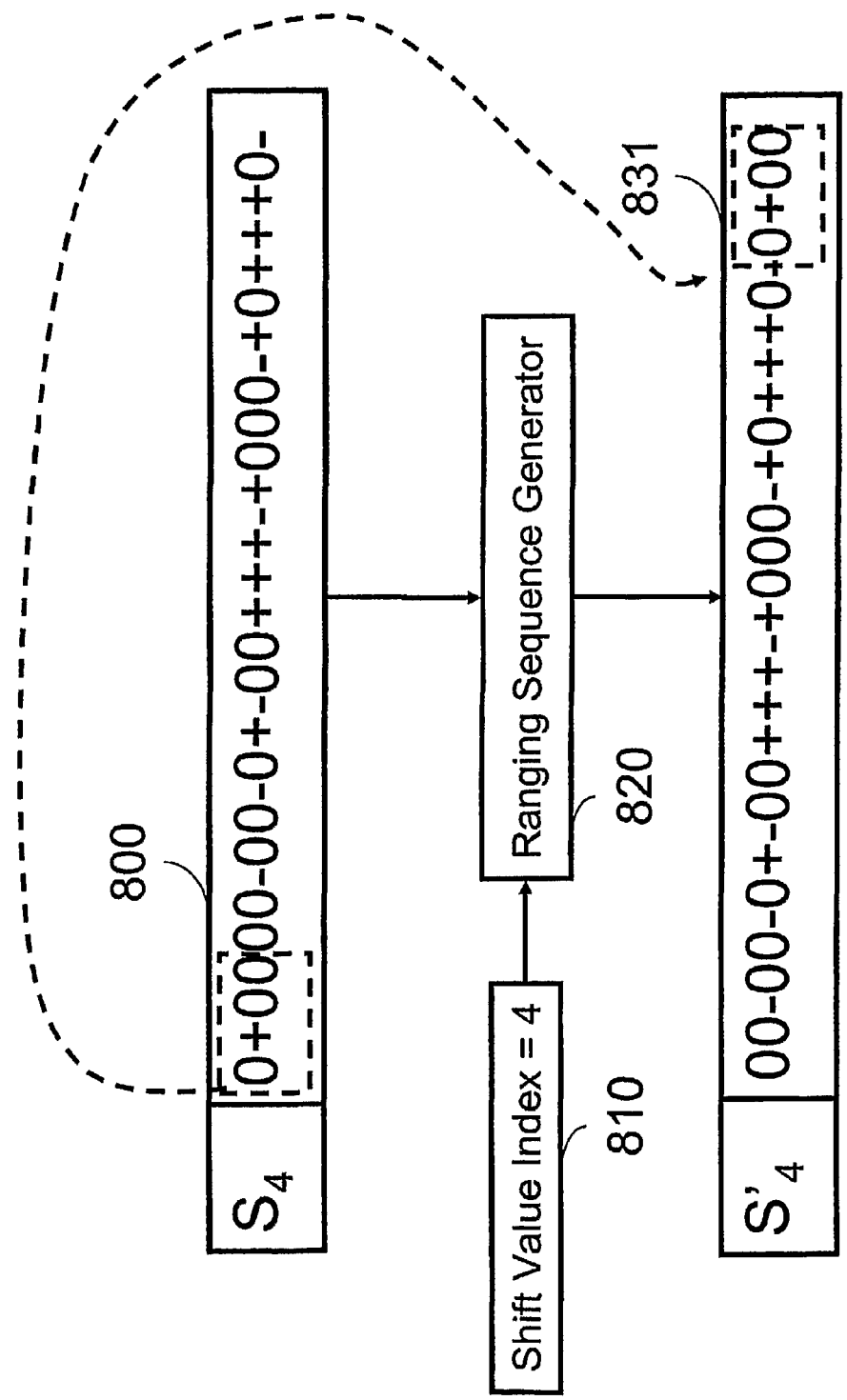
FIG. 11 is flow diagram of a method for generating a circularly shifted ternary sequence from an original ternary sequence according to an embodiment of the invention.

FIG. 11 shows a method for generating a circularly shifted ternary sequence from an original ternary sequence. The ranging sequence generator 820 takes as inputs the original sequence 800 and a shift index value 810, and returns a circularly shifted sequence 831. The repetitions of the output of the ranging sequence generator 820 are used to generate the ranging waveform.

By incorporating a random shift, we increase the degree of freedom in sequence selection to 186 for length-31 sequences, and 635 for length-127 sequences. If only the originator device determines the range to a target device, the turn-around delay time does not have to be included in the range notification packet, but it is important that the originator device factors in the round-trip time of the range packet.

B. Time Hop-IR

In a typical TH-IR scheme, a symbol is divided into equal time intervals $T_c$, and in each interval a single pulse is transmitted. The position of a pulse within a frame is determined according to a time-hopping sequence. Such a TH-IR transmit signal waveform can be expressed as $$S_i(t) = \sqrt{\frac{1}{N_P}} \sum_{j=1}^{N_P} c_j \omega(t-(j-1)T_c - T_h(j)) \quad (3)$$

$$r_i^{th}(t) = \sum_{i=1}^{N_{sym}} S_i(t-iT_{sym}), \quad (4)$$

where $c_j \in 1, -1$ are the polarity scrambling coefficients for spectral smoothing, $T_h$(j) is the time hopping duration in jth frame. $T_h$(j) should be limited to $T_h(j)<T_c-E(\tau_{delay})$ to prevent inter-pulse interference, where $E(\tau_{delay})$ is the expected delay spread of the channel.

When the time-hopping code is known only to the originator and the target device, ranging can be performed privately. Therefore, the range notification packet should specify a time-hopping sequence $\{T_h(1), T_h(2), \ldots T_h(N_p)\}$ in its $S_i$ field, and the same code should be used to generate range packet preambles.

Figure 12:
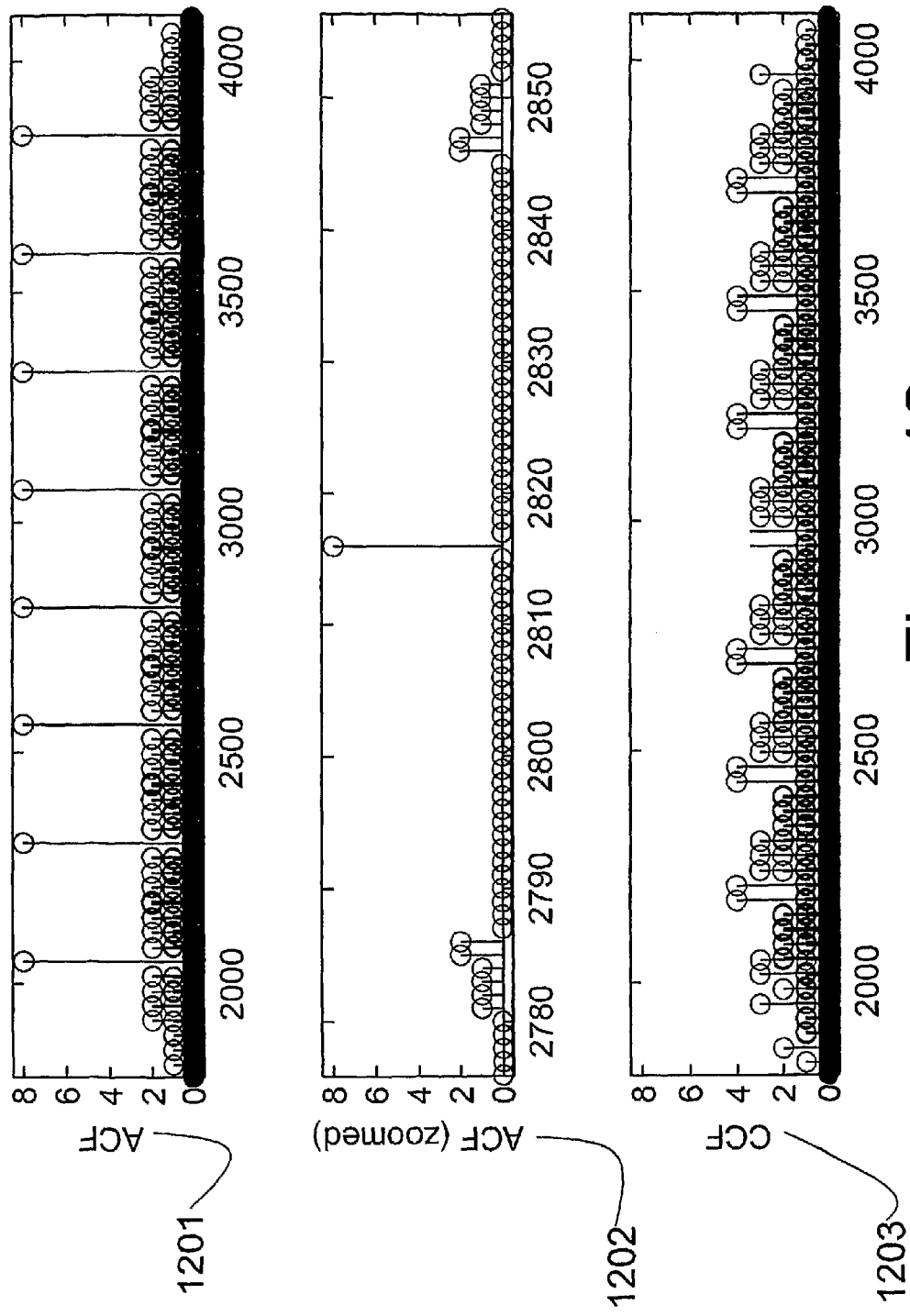
FIG. 12 is a timing diagram of zero correlation zones near correlation peaks according to one embodiment of the present invention.

In FIG. 12, the X-axis stands for PRI index (or the chip index), and the Y-axis shows the correlation output before normalization to unit energy. As shown in FIG. 12, if time hopping codes do not match, zero correlation zones around correlation peaks get perturbed by side-lobes generated due to mismatching correlation. In this case, leading edge detection becomes almost impossible, because the side-lobes become more likely to be detected as the leading signal energy. That is, assume two time hop sequences, $TH_1$ {4,3,4,2,1,3,1,1} and $TH_2$ {1,3,1,3,4,4,2,1}, with $N_p$=8$^1$, $N_{sym}$=8, and $T_c$=32 samples. The auto correlation of the first sequence $TH_1$ is shown in signal 1201. A close-up of this autocorrelation is shown in signal 1202. The cross-correlation between $TH_1$ and $TH_2$ is shown in signal 1203. In the timing signals, the X-axis is a sample index and the y-axis is a correlation output.

Numerous modifications and variations of the present invention are possible in light of the above teachings. It is therefore to be understood that within the scope of the appended claims, the invention may be practiced otherwise than as specifically described herein.

We claim:

1. A method for ranging in a radio communication network, comprising the steps of
receiving a range packet transmitted by a first device in a second device,
manipulating the range packet randomly, wherein in which a manner of manipulating randomly a preamble of the range packet is transmitted from the first device to the second device in a range notification packet; and replying the range packet to the first device from the second device after a delay time known only by the first device and the second device to determine a distance between the first device and the second device.

2. The method of claim 1, further comprising:
selecting the delay time randomly by the first device;
encrypting the delay time; and
transmitting the encrypted delay time to the second device.

3. The method of claim 1, further comprising:
selecting the delay time randomly by the second device;
encrypting the delay time; and
transmitting the encrypted delay time to the first device.

4. The method of claim 3, in which the encrypted delay time is transmitted to the first device before replying the range packet.

5. The method of claim 3, in which the encrypted delay time is transmitted to the first device after replying the range packet.

6. The method of claim 1, further comprising:
transmitting the delay time from the first device to the second device in an encrypted range notification packet.

7. The method of claim 6, in which the range notification packet includes a preamble, a header, an identification, a key, a preamble length, and a preamble waveform identification index.

8. The method of claim 1, further comprising:
transmitting the delay time from the second device to the first device in an encrypted range notification packet.

9. The method of claim 1, in which the range packet is transmitted at a physical layer of the radio network.

10. The method of claim 1, further comprising:
acknowledging the range notification packet to the first device by the second device.

11. The method of claim 1, in which a length of the range packet is manipulated randomly.

12. The method of claim 1, in which the range packet is manipulated randomly by using different base sequence.

13. The method of claim 1, in which the range packet is manipulated randomly by changing pulse repetition intervals.

14. The method of claim 13, in which the manipulation of the pulse repetition intervals uses time hopping.

15. The method of claim 13, in which the manipulation of the pulse repletion intervals uses a drifting local clock.

16. The method of claim 1, in which the radio network uses ultra wideband signaling.

17. The method of claim 1, in which the range packet includes a preamble and an encrypted payload, and the preamble includes fields for synchronization, a start frame delimiter, and a channel estimation.

18. A non-transitory computer program product storing program instructions which when executed by a computer programmed with the program instructions causes the computer to perform the method of claim 1, 2, 3, 4, 5, 6, 8, or 9.

19. An apparatus in a radio communication network for ranging, comprising:
a first device configured to transmit a range packet wherein a manner of manipulating randomly a preamble of the range packet is transmitted from the first device to the second device in a range notification packet;
a second device configured to receive the range packet and to respond to the range packet after a delay time known only by the first device and the second device to determine a distance between the first device and the second device.

20. The apparatus of claim 19, in which the delay time is selected randomly by the first device and transmitted to the second device in an encrypted range packet.

* * * * *